(12) United States Patent
Titus et al.

(10) Patent No.: US 10,244,362 B2
(45) Date of Patent: *Mar. 26, 2019

(54) USE OF RF-BASED FINGERPRINTING FOR INDOOR POSITIONING BY MOBILE TECHNOLOGY PLATFORMS

(71) Applicant: Gozio, Inc., Atlanta, GA (US)

(72) Inventors: Joshua Titus, Kennesaw, GA (US); Kevin Garth Lee, San Jose, CA (US)

(73) Assignee: Gozio Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,552

(22) Filed: Sep. 29, 2017

(65) Prior Publication Data

US 2018/0035263 A1    Feb. 1, 2018

Related U.S. Application Data

(63) Continuation-in-part of application No. 14/510,091, filed on Oct. 8, 2014, now Pat. No. 9,807,724.
(Continued)

(51) Int. Cl.
*H04W 24/00* (2009.01)
*H04W 4/04* (2009.01)
(Continued)

(52) U.S. Cl.
CPC ............... *H04W 4/04* (2013.01); *G01S 5/00* (2013.01); *H04W 64/00* (2013.01); *H04W 4/027* (2013.01); *H04W 4/80* (2018.02)

(58) Field of Classification Search
None
See application file for complete search history.

(56) References Cited

U.S. PATENT DOCUMENTS 8,154,401 B1      4/2012  Bertagna et al.
9,652,975 B1 *   5/2017  Riley ................... A01K 15/021
(Continued)

OTHER PUBLICATIONS

Sapumohotti, C. et al.; "Access Point Selection for WLAN Indoor Localization Systems Using RF Walk Test Data"; Progress in Electromagnetics Research Symposium Proceedings, Taipei, Taiwan, 4 pages; Mar. 25-28, 2013.
(Continued)

*Primary Examiner* — Erika A Washington
(74) *Attorney, Agent, or Firm* — John A. Fortkort; Fortkort & Houston PC

(57) ABSTRACT

A method is provided for determining the position of a mobile technology platform within a structure, wherein the mobile technology platform is equipped with a gyroscope, a magnetometer and at least one accelerometer. The method includes deploying a set of RF (radio frequency) beacons within the structure, wherein each RF beacon emits an RF signal; recording, at each of a set of sampling locations within the structure, the RF signature created by the RF signals received at the location, wherein said recording is performed by a digital image correlation (DIC) platform which traverses the structure, and which correlates the recorded RF signatures to a floor map of the structure; forming an RF fingerprint of the structure from the recorded RF signatures; and using the RF fingerprint, in conjunction with readings from the gyroscope, magnetometer and at least one accelerometer to determine the location of the device within the structure.

25 Claims, 1 Drawing Sheet

Related U.S. Application Data

(60) Provisional application No. 61/888,067, filed on Oct. 8, 2013, provisional application No. 61/888,583, filed on Oct. 9, 2013.

(51) Int. Cl.
  *G01S 5/00* (2006.01)
  *H04W 64/00* (2009.01)
  *H04W 4/02* (2018.01)
  *H04W 4/80* (2018.01)

(56) References Cited

U.S. PATENT DOCUMENTS

| | | | |
|---|---|---|---|
| 9,807,724 B2* | 10/2017 | Titus | H04W 64/00 |
| 2003/0008668 A1 | 1/2003 | Perez-Breva et al. | |
| 2003/0064735 A1 | 4/2003 | Spain et al. | |
| 2004/0058691 A1 | 3/2004 | Filizola et al. | |
| 2004/0259575 A1 | 12/2004 | Perez-Breva et al. | |
| 2005/0037776 A1 | 2/2005 | Perez-Breva et al. | |
| 2005/0040968 A1 | 2/2005 | Damaria et al. | |
| 2006/0261951 A1 | 11/2006 | Koerner et al. | |
| 2007/0004454 A1 | 1/2007 | Schweiger et al. | |
| 2007/0026870 A1 | 2/2007 | Spain et al. | |
| 2008/0274752 A1 | 11/2008 | Houri | |
| 2009/0115580 A1 | 5/2009 | Koerner et al. | |
| 2009/0196267 A1 | 8/2009 | Walker, Sr. | |
| 2010/0227626 A1 | 9/2010 | Dressler et al. | |
| 2010/0311436 A1 | 12/2010 | Bevan et al. | |
| 2011/0137773 A1 | 6/2011 | Davis, III et al. | |
| 2011/0142016 A1 | 6/2011 | Chatterjee | |
| 2011/0207474 A1 | 8/2011 | Hazzani et al. | |
| 2011/0248827 A1 | 10/2011 | Bertoncini et al. | |
| 2011/0269479 A1 | 11/2011 | Ledlie | |
| 2012/0046045 A1 | 2/2012 | Gupta et al. | |
| 2012/0052883 A1 | 3/2012 | Austin et al. | |
| 2012/0056785 A1 | 3/2012 | Jovicic et al. | |
| 2012/0178472 A1 | 7/2012 | Bevan et al. | |
| 2012/0330603 A1 | 12/2012 | Bevan et al. | |
| 2013/0012235 A1 | 1/2013 | Burdo et al. | |
| 2013/0018826 A1 | 1/2013 | Sundararajan et al. | |
| 2013/0045759 A1 | 2/2013 | Smith | |
| 2013/0053059 A1 | 2/2013 | Kruglick | |
| 2013/0095848 A1 | 4/2013 | Gold et al. | |
| 2013/0162481 A1 | 6/2013 | Parvizi et al. | |
| 2013/0172009 A1 | 7/2013 | Gupta et al. | |
| 2013/0190018 A1 | 7/2013 | Mathews | |
| 2013/0195314 A1 | 8/2013 | Wirola et al. | |
| 2013/0225197 A1 | 8/2013 | McGregor et al. | |
| 2013/0288668 A1 | 10/2013 | Pragada et al. | |
| 2013/0310065 A1 | 11/2013 | Austin et al. | |
| 2014/0040175 A1 | 2/2014 | Sundararajan et al. | |
| 2014/0077998 A1 | 3/2014 | Amizur et al. | |
| 2014/0120958 A1 | 5/2014 | Nitta et al. | |
| 2014/0148196 A1 | 5/2014 | Bassan-Eskenazi et al. | |
| 2014/0162589 A1 | 6/2014 | Gupta et al. | |
| 2014/0171068 A1 | 6/2014 | Marti et al. | |
| 2014/0171100 A1 | 6/2014 | Marti et al. | |
| 2014/0213299 A1 | 7/2014 | Marti et al. | |
| 2014/0247279 A1 | 9/2014 | Nicholas et al. | |
| 2014/0247280 A1 | 9/2014 | Nicholas et al. | |
| 2014/0273920 A1 | 9/2014 | Smith | |
| 2014/0274114 A1 | 9/2014 | Rowitch | |
| 2015/0149085 A1 | 5/2015 | Bakshi et al. | |

OTHER PUBLICATIONS

Sekaran, Abirama et al.; "Viability of Pilot Beacons as an Indoor Positioning System"; paper submitted as partial fulfillment of Masters in Interdisciplinary Telecommunications; University of Colorado, Boulder; 11 pages; May 6, 2011.
Geng, Xiongfei et al.; "Hybrid Radio-map for Noise Tolerant Wireless Indoor Localization"; 6 pages; Dec. 14, 2013.
Anderson, Chris; "A clever approach to indoor beacons: ultrasound + IR = GPS"; DIY Drones profile blog; http://diydrones.com/profiles/blogs/705844:BlogPost:29412; 4 pages; Mar. 18, 2008.
Mims, Christopher; "A New Microship Knows Just Where You Are, Indoors and Out"; MIT Technology Review; 2 pages; Apr. 9, 2012.
Martin, J.M. et al.; "Estimating the 3D-position from time delay data of US-waves: Experimental analysis and a new processing algorithm"; Sensors & Actuators A 101; pp. 311-321, 2002.
Jimenez, A.R. and Seco, F.; "Precise Localisation of Archaeological Findings with a new Ultrasonic 3D Positioning Sensor"; Sensors & Actuators A, vol. 123-4; pp. 214-233; Sep. 2005.
Jimenez, A.R. et al.; "Accurate Pedestrian Indoor Navigation by Tightly Coupling Foot-Mounted IMU and RFID Measurements"; IEEE Transactions on Instrumentation and Measurement; vol. 61; No. 1; 12 pages; Jan. 2012.
Jimenez, A.R. et al.; "Improved Heuristic Drift Elimination with Magnetically-aided Dominant Directions (MiHDE) for Pedestrian Navigation in Complex Buildings"; Centre for Automation and Robotics (CAR); 14 pages; 2012.
Jimenez, A.R. et al.; "Improving Inertial Pedestrian Dead-Reckoning by Detecting Unmodified Switched-on Lamps in Buildings"; Sensors 2014; pp. 731-769; Jan. 3, 2014.
Kim, J.H. and Yeo, W.Y.; "A coherent data filtering method for large scale RF fingerprint Wi-Fi Positioning Systems"; EURASIP Journal on Wireless Communications and Networking 2014; vol. 13; 15 pages.
Jimenez, A.R. and Seco, F.; "Ultrasonic Localization Methods for Accurate Positioning"; Instituto de Automatica Industrial. CSIC; Madrid, Spain; 17 pages; Sep. 29, 2005.
Granja, F.S. and Jimenez, A.R.; "Ultrasound modulation and codification for localization systems"; New Acoustics: selected topics II, pp. 167-186; CSIC, Biblioteca de Ciencias; 2006.
CSRIC Indoor Location Test Bed Report Summary Results; NEXTNAV; http://www.nextnav.com/csric-indoor-location-test-bed-report-summary-results; 13 pages; Oct. 1, 2014.
CSRIC Working Group 3, E9-1-1 Location Accuracy; Indoor Location Test Bed Report; 56 pages; Mar. 14, 2013.
Priyantha, N.B. and Gorzczko, M.; "The Cricket Indoor Location System"; MIT Computer Science and Artificial Intelligence Lab; http://nms.lcs.mit.edu/cricket; 29 pages.
Kaseva, V.A. et al.; "A Wireless Sensor Network for RF-Based Indoor Localization"; EURASIP Journal on Advances in Signal Processing; vol. 2008; Article ID 731835; 27 pages; Mar. 26, 2008.
Dodge, Don; "Don Dodge on the Next Big Thing, thoughts on business and technology; Don Dodge on the Next Big Thing: Indoor Location Startups Innovating Indoor Positioning"; 4 pages; Jun. 19, 2013.
Roa, J.O. et al.; "Optimal Placement of Sensors for Trilateration: Regular Lattices vs. Meta-heuristic Solutions"; EUROCAST 2007, LNCS 4739; pp. 780-787; 8 pages; 2007.
Jimenez, A.R. et al.; "Indoor Localization of Persons in AAL scenarios using an Inertial Measurement Unit (IMU) and the Signal Strength (SS) from RFID Tags"; Centre for Automation and Robotics (CAR); 20 pp. 2013.
Seco, F. et al.; "A High Accuracy Magnetostrictive Linear Position Sensor"; Sensors & Actuators A; vol. 123-4; pp. 216-223; Sep. 2005.
Greenstein, B. and Longstaff, B.; "FollowMe: Enhancing Mobile Applications with Open Infrastructure Sensing"; HotMobile; 6 pages; 2011.
IBeacons are BlueTooth LE or BT Smart and 4.0; NewAer blog post posted by "David"; http://newaer.com/ibeacons-are-bluetooth-le-or-bt-smart-and-4-0; 9 pages; Oct. 2014.
Prieto, Jose Carlos et al.; "Robust Regression Applied to Ultrasound Location Systems"; IEEE, 8 pages; 2008.
Seco, F. et al.; "Modulation and Codification of Ultrasonic Signals with EMFi Transducers"; IEEE International Ultrasonics Symposium, 4 pages; Sep. 20-23, 2009.
Seco, F. et al.; "Compensation of Multiple Access Interference Effects in CDMA-based Acoustic Positioning Systems"; IEEE Trans on Instrumentation and Measurement; vol. 63, No. 10; 11 pages; Oct. 2014.

(56) References Cited

OTHER PUBLICATIONS

Laguna, M. et al.; "Diversified Local Search for the Optimal Layout of Beacons in an Indoor Positioning System"; 24 pages; Jul. 24, 2007.
Jimenez, A.R. et al.; "Pedestrian Indoor Navigation by aiding a Foot-mounted IMU with RFID Signal Strength Measurements"; IEEE 2010 Intl. Conference on Indoor Positioning and Indoor Navigation; Zurich Switzerland; 7 pages; Sep. 2010.
Seco, F. et al.; "Improving RFID-Based Indoor Positioning Accuracy Using Gaussian Processes"; IEEE 2010 Intl. Conference on Indoor Positioning and Indoor Navigation; Zurich Switzerland; 8 pages; Sep. 15-17, 2010.
Jimenez, A.R. et al.; "Improved Heuristic Drift Elimination (iHDE) for Pedestrian Navigation in Complex Buildings"; IEEE, 8 pages, 2011.
Jimenez, A.R. et al.; "Ramp Detection with a Foot-Mounted IMU for a Drift-Free Pedestrian Position Estimation"; 2011 Intl. Conference on Indoor Positioning and Indoor Navigation; Guimaraes, Portugal; 4 pages; Sep. 21-23, 2011.
Zampella, F. et al.; "Simulation of Foot-Mounted IMU Signals for the Evaluation of PDR Algorithms"; IEEE, 7 pages; 2011.
Zampella, F. et al.; "A Constraint Approach for UWB and PDR Fusion"; IEEE 2012 Intl. Conference on Indoor Positioning and Indoor Navigation; 9 pages; Nov. 13-15, 2012.
Jimenez, A.R. et al.; "Light-Matching: a new Signal of Opportunity for Pedestrian Indoor Navigation"; IEEE 2013 Intl. Conference on Indoor Positioning and Indoor Navigation; 10 pages; Oct. 28-31, 2013.
Seco, F. et al.; "Joint Estimation of Indoor Position and Orientation from RF Signal Strength Measurements"; 2013 Intlo. Conference on Indoor Positioning and Indoor Navigation, IEEE, 8 pages; Oct. 28-31, 2013.
Zampella, F. et al.; "Robust indoor positioning fusing PDR and RF technologies: The RFID and UWB case"; IEEE 2013 Intl. Conference on Indoor Positioning and Indoor Navigation; 10 pages; Oct. 28-31, 2013.
Guevara, J. et al.; "Auto-localization in Local Positioning Systems: a closed-form range-only solution"; 2010 IEEE International Symposium; 7 pages; Jul. 4-7, 2010.
Prieto, J. et al.; "RoPEUS: A New Robust Algorithm for Static Positioning in Ultrasonic Systems"; Sensors 2009; 9, pp. 4211-4229.
Guevara, J. et al.; "Auto-localization algorithm for local positioning systems"; Elsevier Ad Hoc Networks; vol. 10, pp. 1090-1100; 2012.
Guevara, J. et al.; "Error Estimation for the Linearized Auto-Localization Algorithm"; Sensors 2012; vol. 12, pp. 2561-2581.
Zhu, J. et al.; "Improving Crowd-Sourced Wi-Fi Localization Systems using Bluetooth Beacons"; 2012 9th Annual IEEE Communications Society Conference; 9 pages.
Borenstein, J. et al.; "Where am I? Sensors and Methods for Mobile Robot Positioning"; Prepared by the University of Michigan for the Oak Ridge National Lab (ORNL) D&D Program and the United States Department of Energy's Robotics Technology Development Program; 310 pages; Apr. 1996.
Park, J.; "Indoor Localization using Place and Motion Signatures"; thesis submitted to the Department of Aeronautics and Astronautics, Massachusetts Institute of Technology; 153 pages; Jun. 2013.
Julien Diard, Pierre Bessière, and Emmanuel Mazer, "A survey of probabilistic models, using the Bayesian Programming methodology as a unifying framework", International Conference on Computational Intelligence, Robotics and Autonomous Systems (IEEE-CIRAS), Singapore (2003).
Lim, J. et al.; "Integration of Pedestrian DR and Beacon-AP based Location System for Indoor Navigation"; Intl. Global Navigation Satellite Systems Society; IGNSS Symposium 2013; 7 pages; Jul. 16-18, 2013.
Gubi, K. et al.; "Towards a Generic Platform for Indoor Positioning using Existing Infrastructure and Symbolic Maps"; CHAI Group, School of IT, Sydney University, NSW, Australia; 6 pages; 2006.
Park, J.; "Indoor Localization using Place and Motion Signatures"; thesis; Massachusetts Institute of Technology, Department of Aeronautics and Astronautics; 153 pages; Jun. 2013.
Zampella, F. et al.; Unscented Kalman filter and Magnetic Angular Rate Update (MARU) for an improved Pedestrian Dead-Reckoning; IEEE/ION Position, Location and Navigation Symposium; 11 pages; 2012.
Chapter 3, Ground-Based RF-Beacons and GPS; white paper; www.depaca.uah.es; 30 pages; 2010.
"The Inner Edge: Who Holds the Key to Indoor Nav?"; GPS World; http://gpsworld.com/the-inner-edge-who-holds-the-key-to-indoor-nav; 12 pages; Oct. 1, 2014.
"The Cricket Indoor Location System: An NMS Project@MITCSAIL"; 7 pages; Oct. 1, 2014.
Rowitch, D.; "Technology Challenges and Opportunities in Indoor Location"; 2nd Opportunistic RF Localization for Next Generation Wireless Devices; Worcester Polytechnic Institute; 7 pages; Jun. 13-14, 2010.
"The world of smart indoor navigation and wayfinding, Indoor navigation for everyone"; SmartIndoor; http://smartindoor.com/#indoor-nav; 6 pages; Oct. 1, 2014.
Jimenez, A.R. et al.; "PDR with a Foot-Mounted IMU and Ramp Detection"; Sensors 2011; vol. 11; pp. 9393-9410, 2011.
Yeh, L. et al.; "Indoor Localization: Automatically Constructing Today's Radio Map by iRobot and RFIDs"; Sensors 2009; 4 pages.
"Sensewhere Teams Up with Micello for Indoor Maps"; http://www.sensewhere.com/news/press-release/sensewhere-teams-up-with-micello-for-indoor-maps; 3 pages; Jul. 24, 2012.
"Sensewhere gives away highly-accurate indoor location app with which to navigate at MWC"; http://www.sensewhere.com/news/press-release/sensewhere-gives-away-highly-accurate-indoor-location-app-with-which-to-navigate-at-mwc; 3 pages; Feb. 17, 2012.
Zampella, F. et al.; "Pedestrian Navigation fusing Inertial and RSS/TOF measurements with Adaptive Movement/Measurement Models: Experimental Evaluation and Theoretical Limits"; Sensors and Actuators A: Physical 203; pp. 249-260; 2013.
Vorst, P. et al.; "Indoor Positioning via Three Different RF Technologies"; Abstract; Computer Science Department, University of Tubingen, Tubingen, Germany; 10 pages; 2008.
"Research: RF-based Local Positioning Systems"; LOPSI; http://lopsi.weebly.com/rf-based-lps.html; 2 pages; Oct. 1, 2014.
Purohit, A. et al.; "SugarTrail: Indoor Navigation in Retail Environments without Surveys and Maps"; Abstract; Department of Electrical and Computer Engineering; Carnegie Mellon University; 9 pages; 2013.

\* cited by examiner

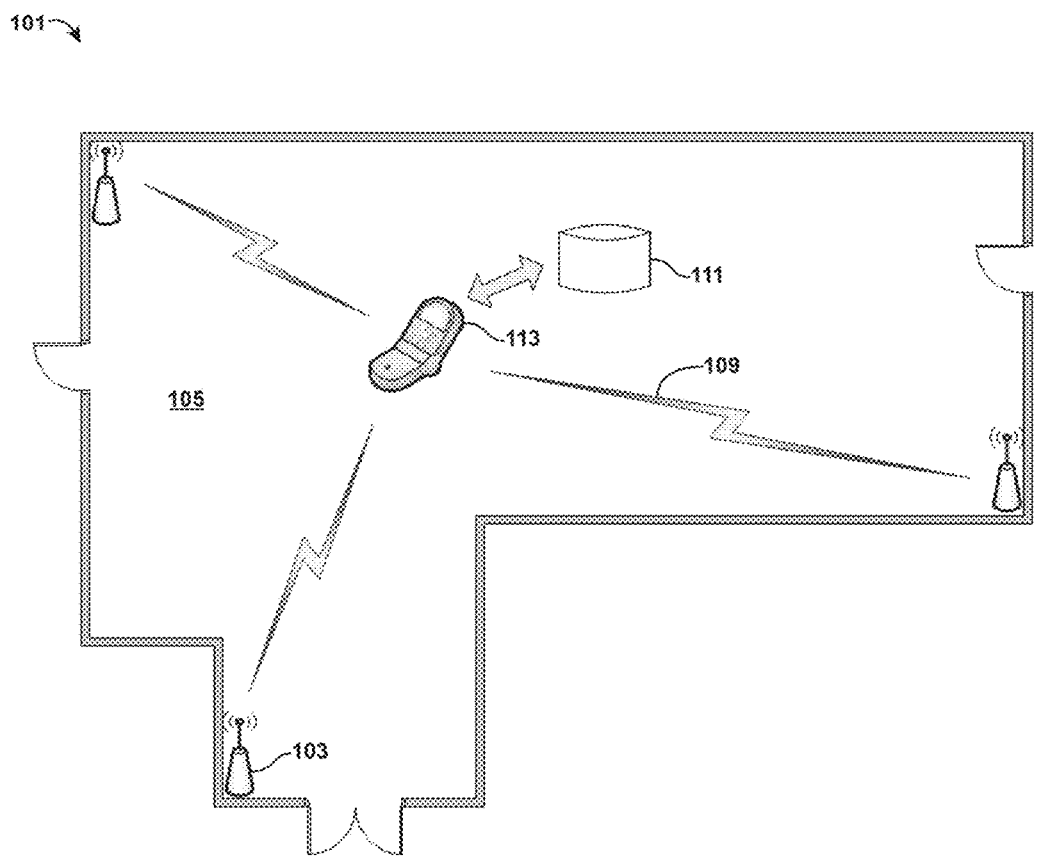

USE OF RF-BASED FINGERPRINTING FOR INDOOR POSITIONING BY MOBILE TECHNOLOGY PLATFORMS

CROSS-REFERENCE TO RELATED APPLICATION

This application is a continuation-in-part of U.S. Ser. No. 14/510,091, filed on Oct. 8, 2014, having the same title and inventors, and which is incorporated herein by reference in its entirety; which claims the benefit of priority from U.S. Provisional Application No. 61/888,067, filed Oct. 8, 2013, having the same title and inventors, and which is incorporated herein by reference in its entirety; and which also claims the benefit of priority from U.S. Provisional Application No. 61/888,583, filed Oct. 9, 2013, entitled "SYSTEMS AND METHODS FOR UTILIZING MAGNETIC FIELDS FOR INDOOR POSITIONING BY MOBILE TECHNOLOGY PLATFORMS", and which is incorporated herein by reference in its entirety.

FIELD OF THE DISCLOSURE

The present disclosure relates generally to location determination, and more particularly to systems and methods for determining indoor location on a mobile technology platform.

BACKGROUND OF THE DISCLOSURE

The advance of Global Positioning System (GPS) technology has revolutionized navigation. GPS, along with cell tower triangular algorithms, are commonly utilized by navigational systems in automobiles and handheld devices to impart location awareness to these devices. Location awareness, when combined with other advances in computer processors and displays, has provided new, feature-rich environments for such devices to operate within.

BRIEF DESCRIPTION OF THE DRAWINGS

FIG. 1 is an illustration of a system in accordance with the teachings herein featuring an indoor area equipped with a set of RF beacons and a mobile technology platform with an associated RF fingerprint database.

SUMMARY OF THE DISCLOSURE

In one aspect, a method is provided for determining the position of a device within a structure. The method comprises (a) deploying a set of RF (radio frequency) beacons within the structure, wherein each RF beacon emits an RF signal; (b) recording, at each of a set of sampling locations within the structure, the RF signature created by the RF signals received at the location; (c) forming an RF fingerprint of the structure from the recorded RF signatures; and (d) using the RF fingerprint to determine the location of the mobile technology platform within the structure. Preferably, said recording is performed by a digital image correlation (DIC) platform which traverses the structure, and which correlates the recorded RF signatures to a floor map of the structure.

In another aspect, a method is provided for determining the position of a mobile technology platform within a structure, wherein the mobile technology platform is equipped with a gyroscope, a magnetometer and at least one accelerometer. The method includes deploying a set of RF (radio frequency) beacons within the structure, wherein each RF beacon emits an RF signal; recording, at each of a set of sampling locations within the structure, the RF signature created by the RF signals received at the location; forming an RF fingerprint of the structure from the recorded RF signatures; and using the RF fingerprint, in conjunction with readings from the gyroscope, magnetometer and at least one accelerometer to determine the location of the device within the structure.

In a further aspect, a method is provided for determining the position of a device within a structure. The method comprises detecting, at a position within the structure, the RF signature created by the RF signals received from a plurality of RF beacons disposed within the structure; and comparing the detected RF signature to an RF fingerprint to determine the most likely location of the device within the structure. The RF fingerprint is created by sampling the RF signatures at a plurality of locations within the structure.

In still another aspect, a system is provided for determining the location of a device within a structure. The system comprises a plurality of RF beacons disposed within the structure, each of which emits an RF signal, and a mobile technology platform. The mobile technology platform is equipped with a receiver which detects RF signatures formed by the signals which are emitted by the RF beacons and which are detected at a location. The mobile technology platform is further equipped with a non-transient memory medium containing (a) an RF fingerprint created by sampling the RF signatures at a plurality of locations within the structure, and (b) suitable programming instructions which, when executed by one or more processors, determines the most likely location of the mobile technology platform by comparing a detected RF signature detected by the receiver to the RF fingerprint.

In yet another aspect, a method for determining the position of a mobile technology platform within a structure is provided. The method comprises (a) deploying a set of RF (radio frequency) beacons within the structure, wherein each RF beacon emits an RF signal; (b) recording, at each of a set of sampling locations within the structure, the RF signature created by the RF signals received at the location; (c) forming an RF fingerprint of the structure from the recorded RF signatures; and (d) using the RF fingerprint, in conjunction with at least one other location determining methodology, to determine the location of the mobile technology platform within the structure. The at least one other location determining methodology may include one or more methodologies selected from the group consisting of GPS, cell tower triangulation, Wi-Fi, Bluetooth, magnetic field strength, and human motion models.

DETAILED DESCRIPTION

Unfortunately, cell tower triangulation is plagued by poor accuracy, and the feature-rich environment provided by GPS does not currently extend to indoor settings. Part of the reason for the shortcoming of GPS has to do with the poor ability of commonly used signals to penetrate concrete, steel and other materials commonly used in building construction. As a result, the many advantages that location awareness imparts to mobile technology platforms often stops at the doorstep. There is thus a need in the art for systems and methodologies which address this issue, and which extend location awareness for mobile technology platforms—and the feature rich environment attendant to such location awareness—to indoor settings.

It has now been found that the foregoing needs may be addressed through the use of a set of RF beacons, which may be utilized in conjunction with RF fingerprinting schemes, to impart location awareness to mobile technology platforms in indoor settings. Some particular, non-limiting embodiments of systems and methodologies which implement this approach are described in greater detail below. The RF fingerprinting schemes are preferably used in conjunction with one or more location determining means based on GPS, cell tower triangulation, Wi-Fi, Bluetooth, magnetic field strength, or human motion models. The use of a human motion model in conjunction with RF fingerprinting schemes is especially preferred, in light of the low power consumption it offers. These various sources may be combined or "fused" into various combinations and sub-combinations, as described in greater detail below.

For purposes of implementing the human motion model, the mobile technology platform is preferably equipped with a gyroscope, a (preferably 3-axis) magnetometer, and at least one accelerometer. Of course, one skilled in the art will appreciate that a magnetometer may also be used as a compass.

In a preferred embodiment, depicted in FIG. 1, a system 101 in accordance with the teachings herein may comprise a set of RF beacons 103 which are disposed at a site 105. The site may be, for example, a building, structure or other indoor area. The beacons 103 utilized in the systems and methodologies described herein may be disposed or positioned within at the site 105 in accordance with various algorithms, functions or schemes. Moreover, these beacons 103 may be disposed on or within walls, on ceilings, in light fixtures or switch plates, in utility structures, in power outlets, or in other suitable locations at the site 105.

Once the beacons 103 are deployed, an RF fingerprint of the site is determined. The fingerprinting process involves recording, at known sampling locations across the site 105, the unique RF signature created by the combination of the signals 109 received from the RF beacons 103 at that point. This recording step is preferably performed by a digital image correlation (DIC) platform which traverses the structure, and which correlates the recorded RF signatures to a floor map of the structure. The collection of all sampling locations combine to form a radio map or RF fingerprint for the site 105. This fingerprint is then stored in a database 111 accessible by a mobile technology platform 113, and may be used by the mobile technology platform 113 for location awareness or location determination. The database 111 and/or fingerprint may be stored on the mobile technology platform 113 (e.g., in a memory medium associated therewith), or may be accessible over a server or by other suitable means.

Once the RF fingerprint for the site has been obtained, the mobile technology platform 113 can then use the fingerprint to determine its location. This may be accomplished, for example, by sensing the RF signature formed by the RF beacons 103 whose signals 109 are received at the present location of the device, and comparing this RF signature to the RF fingerprint to determine the most likely location of the mobile technology platform 113. Preferably, this process does not involve any signal triangulation or signal-arrival-time calculation.

The RF beacons utilized in the systems and methodologies described herein are preferably BLUETOOTH™ low energy (BTLE) devices. Although BTLE was designed for low power, sensor-to-device communication, in a preferred embodiment, the systems and methodologies described herein utilize BTLE devices as simple RF beacons. In this application, the transmit power of the device is preferably maximized and its data transfer abilities are preferably limited to, for example, simple advertising packets. Once configured in this manner, the BTLE device becomes an RF beacon which is powerful enough (for example, it may have a transmission range in excess of 100 m) to permit the fingerprint mapping described herein, and yet is small enough to be easily deployed across the site to be mapped.

The RF beacons described herein may be made in a small form factor and may be extremely power efficient. Consequently, these devices may be run off of batteries for a period of years. Alternatively or in addition, these devices may be equipped with one or more solar cells to harvest energy from ambient light (including light emitted by indoor light fixtures), and/or may be equipped with magnetic induction circuits which allow them to leach power from nearby electrical wiring or power circuits without actually being connected to the wiring or circuitry. The RF beacons may also be equipped to utilize multiple power sources (including the aforementioned ones), and may be provided with suitable intelligence to choose among these sources if necessary.

In some embodiments, the battery charge level of an RF beacon that runs on batteries may be embedded into advertising packets transmitted by the RF beacon. This information may then be utilized to monitor the power state of the beacons. In some embodiments, a user's mobile technology platform may be utilized to relay this information back to one or more servers associated with a company that manages the beacons, or to a computer or other suitable device monitored by maintenance personnel associated with the site at which the beacons are deployed. In other embodiments, a maintenance device, such as a computer system associated with the site, may periodically query the RF beacons for their power status, and may notify appropriate personnel in the event that the power status of any beacon falls below a predetermined threshold value.

Of course, one skilled in the art will appreciate that, while the foregoing description describes the tracking of power levels within the beacons, the same approach may be utilized to track virtually any parameter of the sensors that may be of interest.

In some embodiments of the systems and methodologies described herein, each of the beacons may be configured to determine the RF signature present at the location of the beacon. This signature may be determined periodically, or may be updated when a change in the signal received from another beacon (or beacons) exceeds a threshold value. The signatures determined at each of the beacons may then be utilized to determine or update an RF fingerprint for the site, which may then be utilized by mobile technology platforms for location awareness.

In a preferred embodiment of the methodologies disclosed herein, the "fusion" approach (described in greater detail below) provides an error estimate as an output. This output can then be advantageously utilized to alter an RF fingerprint, thus providing corrections to a radio map over time. For example, in one possible implementation of such a method, a beacon may be placed in a known location. The location of the beacon as deduced from the signal space may then be compared with the actual, known location of the beacon, and appropriate corrections may be made (e.g., to the signal space or the manner in which it is interpreted) to bring the two into better agreement.

In a preferred embodiment of the methodologies disclosed herein, the "fusion" approach utilizes a Bayesian filter that outputs both a putative location for a device, along with a probability associated with that location which represents the degree of uncertainty associated with the putative location. More particularly, in such an embodiment, the Bayesian filter preferably outputs a full probability distribution of where the device may be, with the putative location having the highest probability associated with it.

In such an embodiment, as different users navigate a site, areas in which the devices associated with the different users report high uncertainties may indicate problem areas in the signal space or RF map which need to be rectified. Such problems may arise, for example, due to structural changes to the site (e.g., remodeling or repairs), or due to changes in the performance characteristics of RF beacons (e.g., changes in signal strength over time). Hence, these areas may be targeted for beacon placement or other remedial action.

Alternatively or in addition, this information may be utilized to determine the source of the problem. For example, if the data obtained from the different users indicates problems with magnetometer signals in a problem area (e.g., because the other signal sources accurately identify the location of the users in this area, but the magnetometer signal does not), then the RF map may be tweaked to bring the magnetometer readings into agreement with the other signal sources.

It will be appreciated that multiple iterations of the foregoing approach may be utilized over time to effectively tune the RF map. In this respect, it is to be noted that the user's data (that is, the data associated with the users of multiple mobile technology platforms that navigate the site) may be utilized for this purpose, thus allowing such tuning to be performed remotely. Hence, this approach effectively entails crowd-sourcing corrections to the RF map. This approach may also avoid the need for remapping a site, or may reduce the frequency with which such remapping is necessary, any may thus significantly facilitate the scale-up of the technology.

In some embodiments, such an approach may avoid the need for determining an initial RF fingerprint of the site by other means, and may also provide a system that readily adapts to changes in the structure or environment at the site by creating automatic updates or corrections to the RF fingerprint. However, it should be noted that the methods disclosed herein for obtaining an initial map or RF fingerprint for a site through the use of a robot yield a map that is typically much more accurate than that which could be obtained by currently known crowd-sourcing methods. Hence, while use of a crowd-sourcing approach to make corrections to an existing map or fingerprint can effectively be used to maintain an accurate map, deriving a map solely from crowd-sourcing will typically yield a lower quality map whose quality will typically not improve over time.

In other embodiments, such an approach may be used to determine when an RF fingerprint requires updating, and possibly, which parts of the fingerprint require updating. For example, renovations to a laboratory within a hospital may require updates to the portion of the fingerprint local to the laboratory (e.g., for the area immediately surrounding the laboratory, and possibly just on a portion of the particular floor on which the laboratory is located). However, the remainder of the RF fingerprint for the hospital may remain unchanged. The portions of the fingerprint requiring updates may be determined, for example, by comparing the signatures determined at each of the beacons before and after renovation, and then updating the fingerprint in the areas surrounding the affected beacons.

One of the advantages of the preferred embodiment of the systems and methodologies disclosed herein is that the locations of the beacons do not have to be known, and can remain unknown. This is because location determination is preferably based on RF fingerprinting, not on beacon location. This approach provides significant flexibility in beacon deployment, since it allows beacons to be deployed wherever convenient.

Moreover, in some embodiments of the systems and methodologies described herein, RF fingerprinting is utilized as merely one of multiple sources of positional information. For example, in the systems and methodologies described herein, RF fingerprinting may be utilized in conjunction with one or more location determining means based on GPS, cell tower triangulation, Wi-Fi, Bluetooth, magnetic field strength, or human motion models. These various sources may be combined or "fused" into various combinations and sub-combinations.

For example, in one preferred embodiment, the systems and methodologies disclosed herein utilize a human motion model in which the native accelerometers, gyroscope and magnetometer of a mobile technology platform associated with a user are utilized to estimate the direction and speed with which a user is walking. The accelerometers detect individual steps (which may be utilized to estimate distance traveled), while readings from the gyroscope and magnetometer are utilized to provide a heading estimate. This human motion model then becomes one input into the "Fusion Engine" described below.

The Fusion Engine preferably operates to combine all available signals in a manner that delivers the highest accuracy possible for a given power budget. Each signal source includes an accuracy estimate that may be utilized to determine the contribution that source should make to the final position estimate. The RF map itself may be an additional 'signal' source. These map constraints allow magnetic heading errors to be corrected for, which are a major stumbling block to indoor navigation (magnetic anomalies are frequent and strong indoors, due to the reinforced concrete, steel and high-current power mains found in commercial structures).

It will be appreciated that the signals combined in the Fusion Engine depend, in part, on the resources the mobile technology platform is equipped with. For example, in current ANDROID® devices, inputs to Fusion Engine include GPS, cellular signals, Wi-Fi signals, magnetometer readings, and the human motion model. For current iOs devices (in which the details of WiFi are hidden), the inputs to the Fusion Engine include GPS, cellular signals, BLUETOOTH® signals, magnetometer readings, and the human motion model.

As noted above, in the preferred embodiment of the systems and methodologies described herein, a radio map is provided which includes the collection of all sampling locations for a site. This map may be developed in various ways. For example, the radio map may be obtained by having a person with a mobile technology platform walk the site and record RF signatures at multiple locations within the site. Preferably, however, a dic platform, which may be autonomous or semi-autonomous, is utilized to create the radio map (e.g., by traversing all hallways, corridors and rooms of the site) and to correlate it to a floor map of the site. The correlated radio map is then processed and stored on a server and/or in a suitable memory device (such as, for example, a memory device in a mobile technology platform of a person traveling through the site).

In use, the correlated radio map may be utilized, alone or in combination with other position determining means, to determine a user's position within a site. For example, the RF signature at the user's current location may be compared with the radio map to determine the user's position within the site by finding an RF signature on the radio map which most closely matches the RF signature observed. By contrast, some other means for determining location from RF signals merely use measured distance to RF beacons to determine location. However, in a preferred embodiment, use of a correlated radio map and/or the fusion approach described herein has the potential for much more accurate determination of the user's position within the site, allows the system to correct for anomalies or temporary signal disruptions, and does not require the location of beacons to be known.

Various probabilistic filters may be utilized in the systems and methodologies described herein. Preferably, however, Bayesian filters are utilized. These filters may be recursive or sequential. However, the use of particle filters or sequential Monte Carlo (SMC) methods are especially preferred. Such methods provide a set of on-line posterior density estimation algorithms that estimate the posterior density of the state-space by directly implementing the Bayesian recursion equations.

The use of Bayes filters in the systems and methodologies described herein provide an algorithm for calculating the probabilities of multiple beliefs to allow a mobile technology platform to infer its position and orientation at a site. Essentially, the Bayes filters allow the mobile technology platform to continuously update its most likely position within a coordinate system, based on the most recently acquired sensor data (using the various types of sensors described herein). The associated algorithm is recursive, and consists of prediction and update parts. If the variables are linear and normally distributed the Bayes filter becomes equal to the Kalman filter.

In a simple example, a mobile technology platform moving throughout a site may have several different sensors of the type described herein that provide it with information about its surroundings. The mobile technology platform may start out with a high degree of certainty with respect to its location. However, as it moves through the site and away from its starting position, the mobile technology platform has continuously less certainty about its position. However, by using a Bayes filter in the manner described herein, a probability can be assigned to the determination the mobile technology platform has made about its current position, and that probability can be continuously updated from additional sensor information.

The true state x (i.e., the actual location of the mobile technology platform) is assumed to be an unobserved Markov process, and the measurements z are the observed states of a Hidden Markov Model (HMM). Because of the Markov assumption, the probability of the current true state given the immediately previous one is conditionally independent of the other earlier states, as indicated in EQUATION 1:

$$p(x_k|x_{k-1}, x_{k-2}, \ldots, x_0) = p(x_k|x_{k-1}) \quad \text{(EQUATION 1)}$$

Similarly, the measurement at the $k^{th}$ time step is dependent only upon the current state, and thus is conditionally independent of all other states given the current state, and indicated in EQUATION 2:

$$p(z_k|x_k, x_{k-1}, \ldots, x_0) = p(z_k|x_k) \quad \text{(EQUATION 2)}$$

Using the foregoing assumptions, the probability distribution over all states of the HMM may then be written simply as:

$$p(x_0, \ldots, x_k, z_1, \ldots, z_k) = p(x_0) \Pi_{i=1}^{k} p(z_i|x_i) p(x_i|x_{i-1}) \quad \text{(EQUATION 3)}$$

However, when using the Kalman filter to estimate the state x, the probability distribution of interest is associated with the current states conditioned on the measurements up to the current time step. This is typically achieved by marginalizing out the previous states and dividing by the probability of the measurement set.

The foregoing approach leads to the predict and update steps of the Kalman filter written probabilistically. The probability distribution associated with the predicted state is the sum (integral) of the products of the probability distribution associated with the transition from the $(k-1)^{th}$ time step to the $k^{th}$ and the probability distribution associated with the previous state, over all possible $x_{k-1}$ states. This distribution is given by EQUATION 4 below:

$$p(x_k|z_{1:k-1}) = \int p(x_k|x_{k-1}) p(x_{k-1}|z_{1:k-1}) dx_{k-1} \quad \text{(EQUATION 4)}$$

The probability distribution of update is proportional to the product of the measurement likelihood and the predicted state, as indicated by EQUATION 5 below:

$$p(x_k|z_{1:k}) = \frac{p(z_k|x_k) p(x_k|z_{1:k-1})}{p(z_k|z_{1:k-1})} \quad \text{(EQUATION 5)}$$
$$= \propto p(z_k|x_k) p(x_k|z_{1:k-1})$$

In EQUATION 5, the denominator $$p(z_k|z_{1:k-1}) = \int p(x_k|x_k) p(x_k|z_{1:k-1}) dx_k \quad \text{(EQUATION 6)}$$

is constant relative to x. Therefore, in practice, a coefficient $\alpha$ may typically be substituted for this quantity, which can usually be ignored. The numerator may be calculated and then simply normalized, since its integral must be unity.

In a typical implementation, when SMC methods are applied to determining the location of a mobile technology platform in the systems and methodologies described herein, a grid-based approach may be utilized, and a set of particles may be used to represent posterior density. These filtering methods generate samples from the required distribution without requiring assumptions about the state-space model or the state distributions. The state-space model may be non-linear, and the initial state and noise distributions may take any form required by the application.

The aforementioned SMC methods implement the Bayesian recursion equations directly by using an ensemble based approach. In such an approach, the samples from the distribution are represented by a set of particles, with each particle having a weight assigned to it that represents the probability of that particle being sampled from the probability density function.

The objective of the particle filter is to estimate the posterior density of the state variables, given the observation variables. The particle filter is designed for a hidden Markov Model in which the system consists of hidden and observable variables. The observable variables (observation process) are related to the hidden variables (state-process) by a functional form that is typically known. Similarly, the dynamic system describing the evolution of the state variables is also typically known, at least in a probabilistic sense.

A generic particle filter estimates the posterior distribution of the hidden states using an observation measurement process. For a given state-space, the objective of the particle filter is to estimate the values of the hidden states x, given the values of the observation process y. The particle filter aims to estimate the sequence of hidden parameters $x_k$ for k=0, 1, 2, 3, . . . , based only on the observed data $y_k$ for k=0, 1, 2, 3, . . . . . All Bayesian estimates of $x_k$ follow from the posterior distribution of EQUATION 7:

$$p(x_k|y_0,y_1,\ldots,y_k) \quad \text{(EQUATION 7)}$$

In contrast, the MCMC or importance sampling approach would model the full posterior probability $p(x_0, x_1, \ldots, x_k|y_0, y_1, \ldots, y_k)$.

Particle methods assume $x_k$ and the observations $y_k$ can be modeled in the form:
  (i) $x_0, x_1, \ldots$ is a first order Markov process that evolves according to the distribution $$px_k|x_{k-1}:x_k|x_{k-1}{\sim}px_k|x_{k-1}(x|x_{k-1}) \quad \text{(EQUATION 8)}$$

and with an initial distribution $p(x_0)$;
  (ii) $y_0, y_1, \ldots$ are conditionally independent provided that $x_0, x_1, \ldots$ are known. It will thus be appreciated that each $y_k$ depends only on $x_k$. This conditional distribution for $y_k$ may also be written as:

$$y_k|x_k{\sim}p_{y|x}(y|x_k) \quad \text{(EQUATION 9)}$$

An example system with the foregoing properties is:

$$x_k=g(x_{k-1})+w_k \quad \text{(EQUATION 10)}$$

$$y_k=gh(x_k)+v_k \quad \text{(EQUATION 11)}$$

In EQUATIONS 10 and 11, $w_k$ and $v_k$ are mutually independent and identically distributed sequences with known probability density functions, and $g(\bullet)$ and $h(\bullet)$ are known functions. These two equations may be viewed as state space equations, and are similar to the state space equations for the Kalman filter. If the density functions $g(\bullet)$ and $h(\bullet)$ are linear, and if $w_k$ and $v_k$ are Gaussian, the Kalman filter yields the Bayesian filtering distribution. If not, Kalman filter based methods are a first-order approximation (EKF) or a second-order approximation (UKF in general, but if probability distribution is Gaussian a third-order approximation is possible). Particle filters are also an approximation, but with enough particles they can be much more accurate.

Bayesian filters and particle filters, and the associated methodologies of using such filters, are generally known to the art, although the applications of these filters as described herein is believed to be novel. Such filters are described in greater detail in, for example, the article by Julien Diard, Pierre Bessiere, and Emmanuel Mazer, entitled "A Survey of Probabilistic Models, using the Bayesian Programming Methodology as a Unifying Framework", which is available online at http://cogprints.org/3755/1/Diard03a.pdf, and which is incorporated herein by reference in its entirety; and in the reference by Simo Särkkä, entitled "Bayesian Filtering and Smoothing" (2013), which is available online at http://bees.aalto.fi/~ssarkka/pub/cup_book_online_20131111.pdf, and which is also incorporated herein by reference in its entirety.

Various embodiments of the systems, methodologies and devices disclosed herein may utilize one or more software programs or algorithms to perform various actions or steps. These include, without limitation, the performance of various data processing steps, the implementation of mathematical calculations or statistical modeling, and the rendering of suitable web pages or windows on the displays of mobile technology platforms. These software programs or algorithms may consist of suitable programming instructions recorded in a tangible, non-transient medium which, when implemented by one or more computer processors, performs the corresponding actions or steps.

Various mobile technology platforms may be utilized in the systems, methodologies and devices disclosed herein. These include, for example, smartphones, smartwatches, smart glasses, tablet PCs, notebook computers, wearable PCs, and other computational devices that are commonly carried by a user and may be used for indoor navigational purposes.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for determining the position of a mobile technology platform within a structure, wherein the mobile technology platform is equipped with a gyroscope, a magnetometer and at least one accelerometer, the method comprising:
   deploying a set of RF (radio frequency) beacons within the structure, wherein each RF beacon emits an RF signal, and wherein each RF beacon emits radio transmissions within the band of 2400 to 2800 MHz;
   recording, at each of a set of sampling locations within the structure, the RF signature created by the RF signals received at the location, wherein said recording is performed by a digital image correlation (DIC) platform which traverses the structure, and which correlates the recorded RF signatures to a floor map of the structure;
   forming an RF fingerprint of the structure from the recorded RF signatures; and
   using the RF fingerprint, in conjunction with readings from the gyroscope, magnetometer and at least one accelerometer to determine the location of the mobile technology platform within the structure.

2. The method of claim 1, wherein using the RF fingerprint, in conjunction with readings from the gyroscope, magnetometer and at least one accelerometer to determine the location of the mobile technology platform within the structure, includes:
   detecting the RF signatures received at a location; and
   comparing the detected RF signatures to the RF fingerprint to determine the most likely location of the device.

3. The method of claim 2, wherein the device is equipped with an RF receiver, and wherein detecting the RF signatures received at a location includes detecting the RF signatures with the receiver.

4. The method of claim 2, wherein comparing the detected RF signatures to the RF fingerprint involves comparing the detected RF signatures to a copy of the RF fingerprint stored in a memory medium associated with the device.

5. The method of claim 1, wherein the mobile technology platform is equipped with a plurality of accelerometers, and wherein the RF fingerprint is used in conjunction with readings from the gyroscope, magnetometer and the plurality of accelerometers to determine the location of the mobile technology platform within the structure.

6. The method of claim 1, wherein each member of the set of RF beacons emits a unique RF signal.

7. The method of claim 1, wherein each member of the set of RF beacons encodes a unique set of data in the RF signal it transmits.

8. The method of claim 1, wherein each of the RF beacons is a BTLE (Bluetooth™ low energy) device, and wherein each of the RF beacons has a transmission range in excess of 100 m.

9. The method of claim 1, wherein the mobile technology platform uses at least one Bayes filter to calculate the probabilities of multiple beliefs to allow the mobile technology platform to infer its position and orientation at a site.

10. The method of claim 9, wherein the at least one Bayes filter is a Kalman filter.

11. The method of claim 9, wherein the at least one Bayes filter utilizes a true state, and wherein the true state utilized in the at least one Bayes filter is the actual location of the mobile technology platform, and is assumed to be an unobserved Markov process in calculating the probabilities of multiple beliefs.

12. The method of claim 9, wherein the mobile technology platform uses sequential Monte Carlo (SMC) methods to calculate the probabilities of multiple beliefs to allow the mobile technology platform to infer its position and orientation at a site, and wherein the SMC methods implement Bayesian recursion equations by using an ensemble based approach in which samples from a distribution are represented by a set of particles, with each particle having a weight assigned to it that represents the probability of that particle being sampled from a probability density function based on the calculated probabilities.

13. The method of claim 12, wherein a particle filter is used to estimate the posterior density of the state variables, given the observation variables, and wherein the particle filter is designed for a hidden Markov Model in which a system on which the model is based consists of hidden and observable variables.

14. The method of claim 13, wherein the mobile technology platform uses a Bayesian filter to infer its position and orientation at a site, and wherein the Bayesian filter outputs both a putative location for a device, along with a probability associated with that location which represents the degree of uncertainty associated with the putative location.

15. The method of claim 1, wherein the structure is a hospital.

16. The method of claim 1, wherein the mobile technology platform is selected from the group consisting of smartphones, smartwatches, smart glasses, tablet PCs, notebook computers, and wearable PCs.

17. The method of claim 1, wherein the mobile technology platform and the DIC platform are separate devices.

18. The method of claim 17, wherein the mobile technology platform is a smartphone.

19. A method for determining the position of a mobile technology platform within a structure, wherein the mobile technology platform is equipped with a gyroscope, a magnetometer and at least one accelerometer, the method comprising:
detecting, at a position within the structure, the RF signature created by the RF signals received from a plurality of RF beacons disposed within the structure, wherein each of the plurality of RF beacons emits radio transmissions within the band of 2400 to 2800 MHz; and
in conjunction with readings from the gyroscope, magnetometer and at least one accelerometer, comparing the detected RF signature to an RF fingerprint to determine the most likely location of the mobile technology platform within the structure;
wherein the RF fingerprint is created by sampling the RF signatures with a digital image correlation (DIC) platform at a plurality of locations within the structure.

20. The method of claim 19, wherein using the RF fingerprint to determine the location of the device within the structure includes:
detecting the RF signatures received at a location; and
comparing the detected RF signatures to the RF fingerprint to determine the most likely location of the device.

21. The method of claim 20, wherein the device is equipped with an RF receiver, and wherein detecting the RF signatures received at a location includes detecting the RF signatures with the receiver.

22. The method of claim 20, wherein comparing the detected RF signatures to the RF fingerprint involves comparing the detected RF signatures to a copy of the RF fingerprint stored in a memory medium associated with the device.

23. The method of claim 19, wherein each member of the set of RF beacons emits a unique RF signal.

24. The method of claim 19, wherein each member of the set of RF beacons encodes a unique set of data in the RF signal it transmits.

25. A system for determining the location of a device within a structure, the system comprising:
a plurality of RF beacons disposed within the structure, each of which emits an RF signal, wherein each of the plurality of RF beacons emits radio transmissions within the band of 2400 to 2800 MHz; and
a mobile technology platform equipped with a gyroscope, a magnetometer, at least one accelerometer, and a receiver which detects RF signatures formed by the signals which are emitted by the RF beacons and which are detected at a location, and which is further equipped with a non-transient memory medium containing (a) an RF fingerprint created by sampling the RF signatures at a plurality of locations within the structure with a digital image correlation (DIC) platform, and (b) suitable programming instructions which, when executed by one or more processors, determines the most likely location of the mobile technology platform within the structure by comparing a detected RF signature detected by the receiver to the RF fingerprint, in conjunction with readings from the gyroscope, magnetometer and at least one accelerometer.

* * * * *